(12) United States Patent
Ejiri et al.

(10) Patent No.: US 6,639,693 B1
(45) Date of Patent: *Oct. 28, 2003

(54) DATA COMMUNICATION APPARATUS AND METHOD THEREFOR

(75) Inventors: Seishi Ejiri, Kawasaki (JP); Shin Yamaguchi, Hiratsuka (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/635,518

(22) Filed: Apr. 22, 1996

(30) Foreign Application Priority Data

Apr. 25, 1995 (JP) .............................. 7-101197

(51) Int. Cl.⁷ ................................. H04N 1/00
(52) U.S. Cl. ...................... 358/434; 358/442; 358/407; 358/468
(58) Field of Search ................................ 358/434, 442, 358/444, 400, 402, 468, 407, 403; 379/100.01, 100.12, 100.13, 100.15

(56) References Cited

U.S. PATENT DOCUMENTS

| | | | | |
|---|---|---|---|---|
| 4,206,444 A | * | 6/1980 | Ferlan | 340/147 |
| 4,891,769 A | * | 1/1990 | Tasaki | 364/519 |
| 5,051,720 A | * | 9/1991 | Kittirutsunetorn | 340/310 R |
| 5,146,493 A | * | 9/1992 | Kiguchi et al. | 379/357 |
| 5,255,312 A | * | 10/1993 | Koshiishi | 379/100 |
| 5,262,872 A | * | 11/1993 | Yoshimura et al. | 358/296 |
| 5,410,419 A | * | 4/1995 | Muramatsu et al. | 358/468 |
| 5,434,973 A | * | 7/1995 | Lu | 395/200 |
| 5,519,506 A | * | 5/1996 | D'Avello et al. | 358/442 |
| 5,537,462 A | * | 7/1996 | Utter et al. | 379/102 |
| 5,552,901 A | * | 9/1996 | Kikuchi | 358/468 |
| 5,574,859 A | * | 11/1996 | Yeh | 395/200.01 |
| 5,596,628 A | * | 1/1997 | Klein | 379/93 |
| 5,619,251 A | * | 4/1997 | Kuroiwa et al. | 348/12 |
| 5,644,404 A | * | 7/1997 | Hashimoto et al. | 358/402 |
| 5,678,800 A | * | 10/1997 | Fisher, Jr. et al. | 395/700 |
| 5,680,547 A | * | 10/1997 | Chang | 395/200.01 |
| 5,694,226 A | * | 12/1997 | Yokoyama | 358/468 |
| 5,832,190 A | * | 11/1998 | Terajima et al. | 395/113 |
| 6,031,977 A | * | 2/2000 | Pettus | 395/200.6 |

* cited by examiner

Primary Examiner—Mark Wallerson
(74) Attorney, Agent, or Firm—Fitzpatrick, Cella, Harper & Scinto (57) ABSTRACT

The present invention is to provide a data communication apparatus and a method which can transfer data even if a terminal is not operated. The data communication apparatus comprises reception means for receiving data from a transmission side, connection means for connecting the apparatus to an external device, initiation means for initiating the external device when the external device which is connected through said connection means is not in an operable state, and discrimination means for discriminating a type of data which is received by said reception means, wherein said initiation means performs an initiation on the basis of a discriminated result of said discrimination means.

24 Claims, 5 Drawing Sheets

DATA COMMUNICATION APPARATUS AND METHOD THEREFOR

BACKGROUND OF THE INVENTION

1. Field of the Invention

The present invention relates to a data communication apparatus and a method for performing a data communication with a partner's device, and more particularly to a data communication apparatus connected to an another terminal device and to a data communication method performed between the data communication apparatus and the another terminal device.

2. Related Background Art

Hitherto, as a data communication apparatus for performing a data communication, a facsimile apparatus has been widely known. In a conventional facsimile apparatus, a transmission side facsimile apparatus encodes bit-mapped image data, which is obtained by reading an original image, by a predetermined method (for example, MH or MR method), thereafter performing a transmission. A reception side facsimile apparatus decodes encoded data, which is received from the transmission side, to a bit-map image. The above-mentioned facsimile apparatus can not perform a communication using code data such as text data or the like formed in an information processing terminal, e.g., a personal computer or the like. Even if the code data has been received, it has not been possible to obtain bit-mapped image data at the reception side facsimile apparatus.

However, in recent years, the following system has been proposed. That is, the information processing terminal which can process code data is connected to the facsimile apparatus for transferring the code data received by the facsimile apparatus to the information processing terminal, thereby enabling to decode the received data in the information processing terminal as the bit-mapped image data.

Further, the following system has been also proposed. That is, the facsimile apparatus is connected to a LAN (local area network) for receiving data transmitted from the transmission side together with a terminal designation, so as to transfer it to a designated terminal on the LAN or to a terminal which is previously designated at the reception side.

However, conventionally, in a case where the terminal is not operated, since a power of the terminal, which is connected to the facsimile apparatus and receives reception data, is turned off, there occurs such a problem as the facsimile apparatus has to refuse to receive data transmitted from the transmission side or has to accumulate the data in a memory.

SUMMARY OF THE INVENTION

An object of the present invention is to provide a data communication apparatus and a method which can eliminate the above-mentioned problem.

Another object of the present invention is to provide a data communication apparatus and a method which can transfer data even if a terminal, which has to transfer received data, is not operated.

Still another object of the present invention is to provide a data communication apparatus and a method which can efficiently process received data.

Still another object of the present invention is to provide a data communication apparatus and a method which can properly initiate a terminal to which received data is transferred.

The above and other objects of the present invention will become apparent from the following detailed description based on the accompanying drawings.

DETAILED DESCRIPTION OF THE PREFERRED EMBODIMENTS

An embodiment of the present invention will be described in detail hereinafter with reference to the accompanying drawings.

Figure 1:
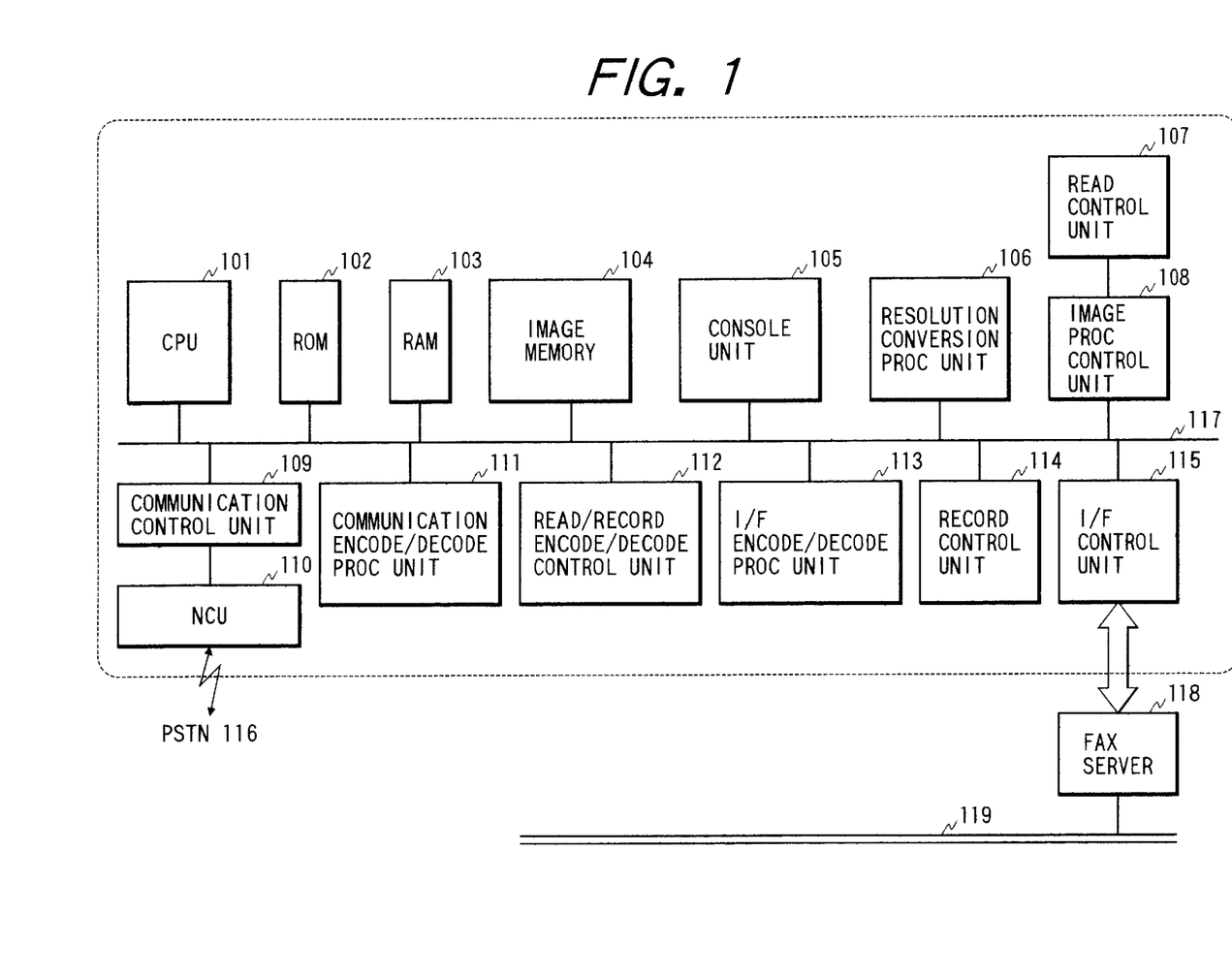
FIG. 1 is a block diagram showing the structure of a facsimile apparatus according to an embodiment of the present invention.

FIG. 1 is a block diagram showing the schematic structure of a facsimile apparatus according to an embodiment of the present invention.

A CPU (central processing unit) 101, which is a system control unit entirely controls the facsimile apparatus through a system bus 117. A ROM (read only memory) 102 stores a control program of the CPU 101, an operating system (OS) program and the like. A RAM (random access memory) 103 which is composed of an SRAM (static random access memory) and the like stores program control parameters and the like. A set-value registered by an operator, management data of the apparatus, a buffer for various works and the like are stored in the RAM 103. An image memory 104 which is composed of a DRAM (dynamic random access memory) and the like accumulates image data. In the present embodiment, each control program stored in the ROM 102 performs such software controls as a scheduling, a task switching and the like under the management of the OS stored in the ROM 102.

A console unit 105 which is composed of various keys, an LED (light emitting diode), an LCD (liquid crystal display) and the like performs various input operations instructed by an operator and displays a state of the facsimile apparatus and a communication state.

A read control unit 107 is composed of a CS (color scanner) image sensor, an original conveying system and the like. The read control unit 107 optically reads an original image using the CS image sensor for converting it into electric image data. Then, various image processes such as a binarization process, a halftone process and the like are performed by an image process control unit 108 to output a high-quality image data. The converted image data is encoded according to a predetermined encoding method such as an MH (modified huffman) method or an MR (modified read) method through a read/record encode/decode control unit 112 for accumulating it in the image memory 104.

A record control unit 114 is composed of a page printer, a record image process control unit and the like. Image data to be recorded is decoded in the read/record encode/decode control unit 112, and in the record control unit 114, various image processes such as a smoozing process, a record density correction process and the like are performed by the record image process control unit for converting data into high-quality image data to output it to the page printer such that an image is printed on a recording sheet.

A communication control unit 109 which is composed of a MODEM (modulator-demodulator) and the like performs a modulation/demodulation control for a facsimile transmission/reception signal. An NCU (network control unit) 110 transmits a selection signal (dial pulse or tone dialer) to an analog communication line PSTN (public switched telephone network) 116 and detects a call signal for performing a line control such as an automatic reception control or the like. The image data accumulated in the image memory 104 is decode processed in a communication encode/decode process unit 111 and a milli/inch resolution conversion, a magnification/reduction process or the like is performed in a resolution conversion process unit 106. The resolution converted image is encode processed in the communication encode/decode process unit 111 in accordance with a capacity of a transmission partner and is transmission controlled.

An I/F (interface) control unit 115 performs an interface control between the facsimile apparatus and an information process terminal (FAX server) 118 to be connected to an external device. In the present embodiment, it is assumed that the I/F control unit 115 responds to a parallel interface such as a bidirectional centronics interface or the like. The FAX server 118 is connected to a LAN (local area network) 119 and accepts such a remote operation request as a facsimile transmission request, a print request or the like from an information process terminal (client machine) on the LAN 119 to perform such a control as the remote operation for the connected facsimile apparatus.

Such a remote operation as a transmission from the FAX server 118 to the facsimile apparatus, a print, a data registration or the like is performed by transmitting the predetermined set command, parameter data and the like to the facsimile apparatus through the I/F control unit 115. It should be noted that, in the present embodiment, an application software and a driver software for controlling the remote operation and the remote operation request are installed in the FAX server 118.

Figure 2:
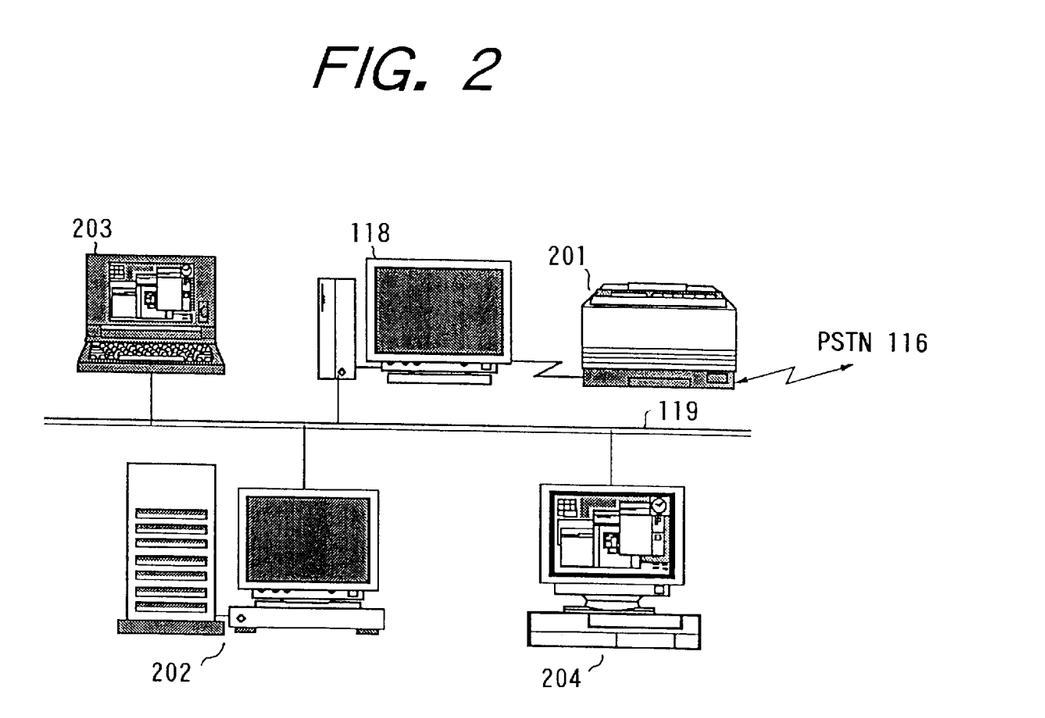
FIG. 2 indicates an example of connecting a facsimile apparatus and a FAX server 118 shown in FIG. 1 to a LAN 119.

FIG. 2 is a schematic view showing a connecting form of the facsimile apparatus according to an embodiment of the present invention.

A reference numeral 201 denotes the facsimile apparatus shown in FIG. 1.

A file server 202 performs such a control as a protocol management of the LAN, a file management on the LAN 119 or the like.

Client machines 203 and 204 are connected to the LAN 119. The client machines are personal computers which can process code data and are automatically logged in (LOGIN) the LAN 119 when a power is turned on. It should be noted that the client machines are not limited to the above two machines but a plurality of machines can be connected to the LAN 119.

The FAX server 118 has tables respectively corresponding to a user name, a user ID (identification) and a network address of the client on the LAN 119. Even if a receiver is designated by any method from a transmission side, data can be transferred to the client machine of the receiver by means of the tables. Even if the client machine on the LAN 119 is not logged in (LOGIN), data can be transferred by discriminating an exist position of the client machine. The facsimile apparatus 201 can discriminates a state of the client machine on the LAN 119 by exchanging information with the FAX server 118 and exchanges data with the client machine on the LAN 119 through the FAX server 118.

Figure 3:
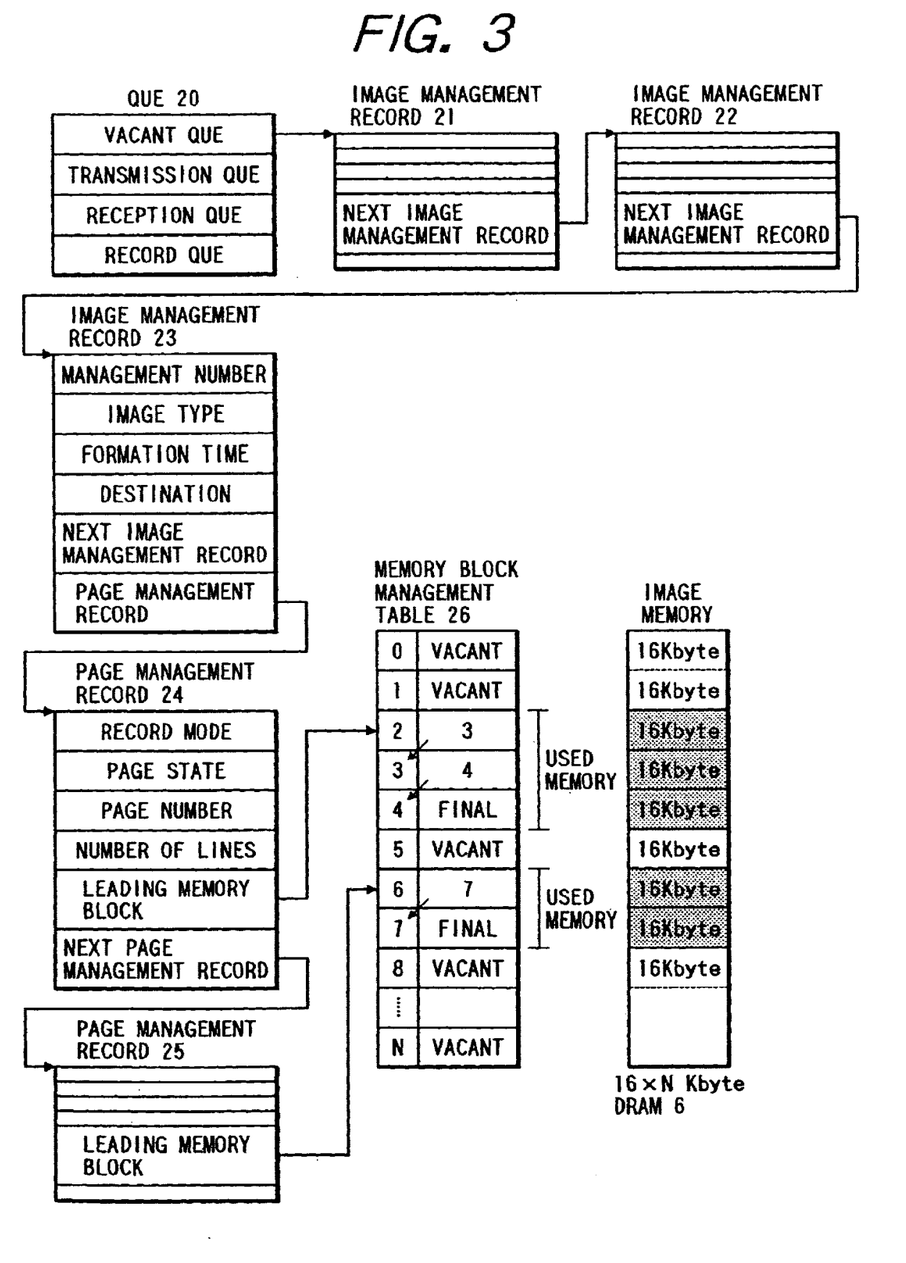
FIG. 3 indicates a data management method by an image memory 104 in a facsimile apparatus 201.

A data management method of the memory 104 in the facsimile apparatus 201 will be described with reference to FIG. 3.

Each communication is completely managed by image management records 21, 22 and 23. The image management record is constituted by items such as a management number, formation time, a destination, an image type, a pointer to a next image management record, a pointer to a page management record and the like and is positioned on the ROM 103. If a file is an image data file or a code data file, it is stored in an image type area of the image management record 23. The fact that data is code data is judged from the contents of a header of data.

The pointers to the image management records are all written in a management table on the RAM 103 called as a que 20. In a case where plural image management records are connected to the same que, the pointer to the image management record to be connected is written in a column of "next image management record" of an end image management record as indicated by image management records 21 and 22.

When a transmission or a record is performed, the next image management record is searched sequentially from the pointer of the image management record written in each que to select an objected image. When an initialization is performed, all management records are connected to a vacant (or evacuated) que.

An image for one page is managed by page management records 24 and 25, which are formed every read or reception for one page, constituted by such items as a record mode, a page state, a page number, the number of lines, a pointer to a next page management record, a leading memory block number and the like and are positioned on the RAM 103. When the initialization is performed, all page management records are connected to a vacant management record (not shown).

The image memory 104 (DRAM 6) is divided into memory blocks of 16 Kbyte and is managed. Each block is corresponding to a management number sequentially from 0 and is managed by a memory block management table 26. When the initialization is performed, a code indicating vacant is written in an item corresponding to each block of the memory block management table.

In a case where the image memory 104 is used by such an operation as a communication reservation, one image management record is separated from the vacant que and is connected to a transmission que. One page management record is separated from the next vacant management table and the pointer is written in an item of the page management record of the previously obtained image management record.

Then, a vacant code written block number is selected from the memory block management table and a block number to be used is written in an item of the leading memory block number of the page management record. At the same time, a code indicating a final block is written in the memory block management table. When memory blocks, which are equal to or greater than two blocks, are used, a next memory block management number is written and a final block code is written in a column corresponding to a next memory block.

When a certain image is deleted, the image management record is re-connected to the vacant que, the page management record is re-connected to the vacant management table and the memory block management table is rewritten to a code indicating that items from the leading block to the final block indicated by the page management record to be deleted are vacant state.

Figure 4:
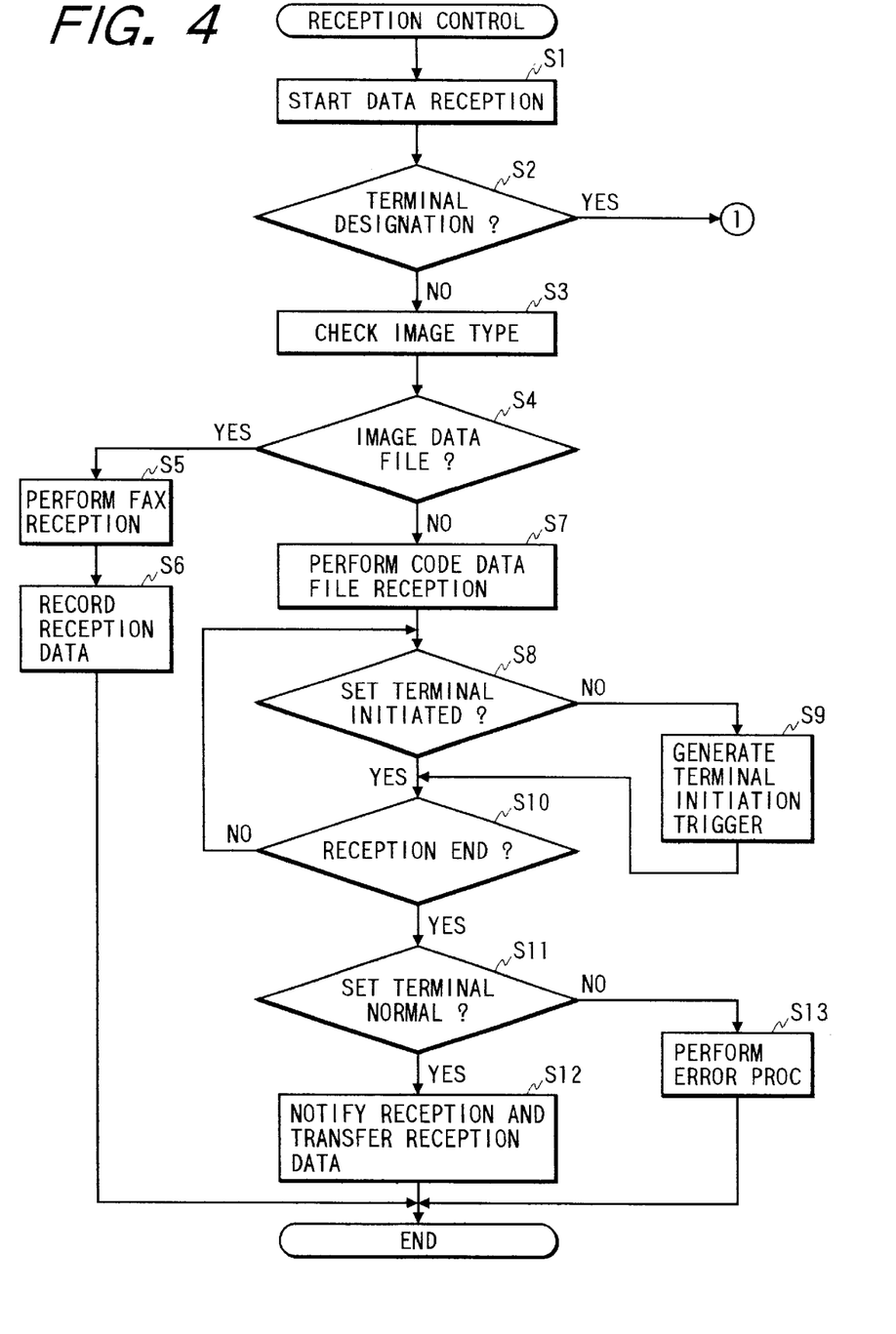
FIGS. 4 and 5 are flow charts showing process flows when data from a transmission side is received.
Figure 5:
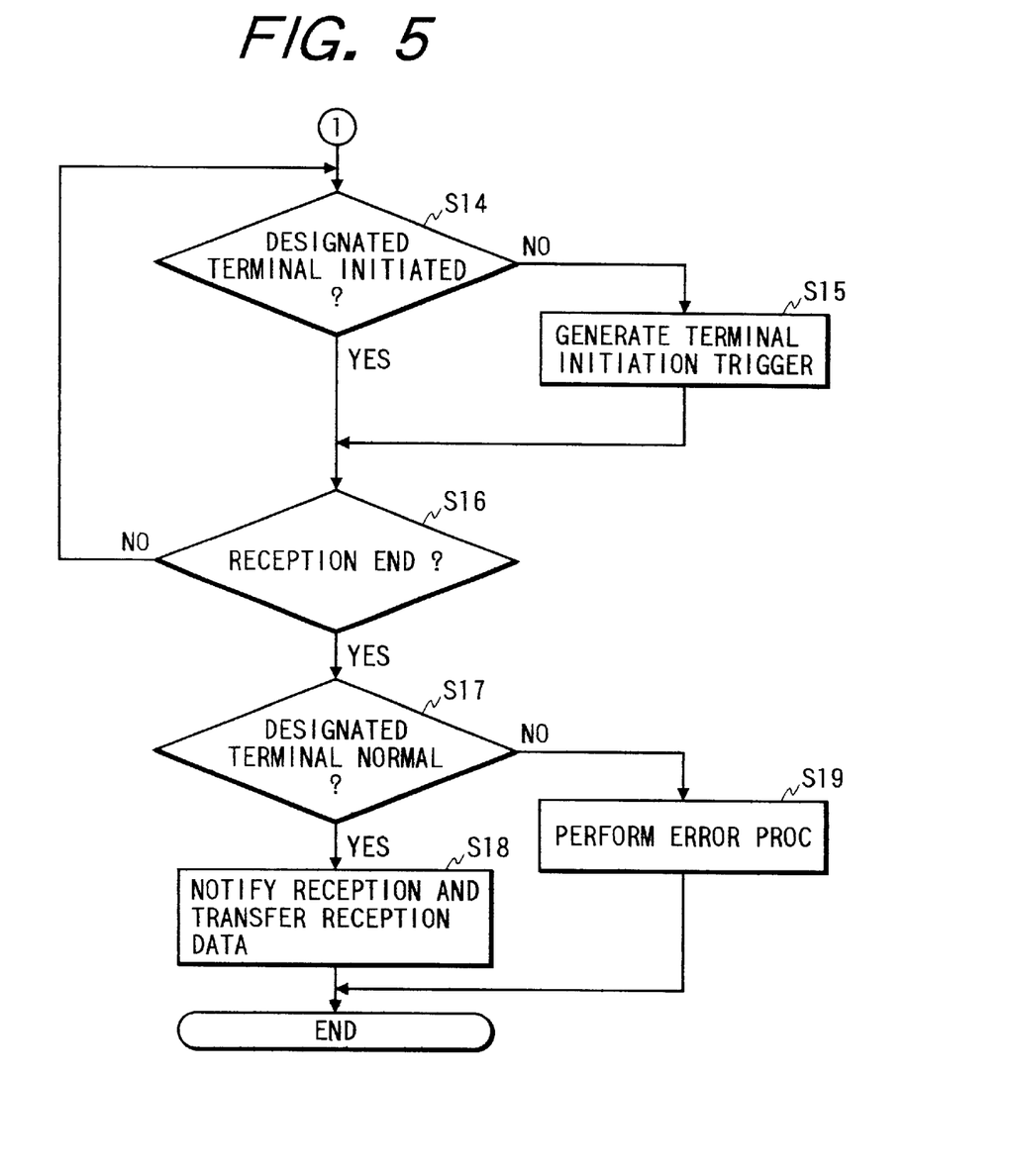

Next, a process flow when data from the transmission side is received will be described with reference to flow charts shown in FIGS. 4 and 5. It should be noted that the flow chart shows a process flow controlled by the CPU 101 based on a program stored in the ROM 102. The CPU 101 performs a control while communicating with the FAX server 118, which performs a process based on an instruction from the CPU 101.

First, in a step S1, it is started to transmit and receive a procedure signal in a facsimile communication through the PSTN 116 and is recognized to perform such a control as described in the present embodiment by an NSS signal transmitted from the transmission side, then, the following process is performed. Received data is sequentially accumulated in the image memory 104. When data is code data, it is assumed that various information (for example, a code type and the like) are added to a header portion of data. In a step S2, it is judged whether a terminal on the LAN 119 is designated or not from the transmission side (terminal designation information is included in the header portion of data transmitted from the transmission side). If the terminal is designated, a process flows to a step S14. If the terminal is not designated, a process flows to a step S3.

In the step S3, a type of received data file is judged referring to the image type area of the image management record 23. In the step S4, if it is judged that received data is an image file which is based on bit-mapped image data (data encoded by the MH method, MR method or the like), a process flows to a step S5 to perform a reception process treating data as facsimile data, then, data is record output on a record sheet by the record control unit 114 in a step S6 after decoding data to a bit-map image in the read/record encode/decode control unit 112.

On the other hand, in the step S4, if it is judged that the received data is not the image file, a process is started in a step S7 by treating the received data as code data such as text data or the like. In a case where code data is received by a reception side operator without designating a terminal on the LAN 119 from the transmission side, it is assumed that a terminal to which data is transferred (for example, the client machine 204) is previously designated and set in the RAM 103. In a step S8, it is judged whether the set client machine is initiated or not (whether a power is turned on or not). If the client machine is not initiated, a process flows to a step S9 to generate a power-on trigger signal for the set client machine through the FAX server 118.

If a connection with the information process terminal is a bidirectional parallel interface, the power-on trigger signal can be supplied to the client machine by varying a level of a signal line "Peripheral Logic High". In the step S9, the trigger signal is generated in this manner. Thereafter, a code data file reception is continuously performed to check a termination of a reception (step S10), a state of the client machine in the step S8 is observed until the reception is terminated and a process for generating the trigger signal in the step S9 is properly repeated. During this period, the set client machine initiates a software for receiving and processing code data. Next, if it is judged that the reception is terminated in the step S10, a process flows to a step S11 and it is judged whether the set client machine is in a normal state or not. If it is judged that the client machine is in the normal state, a software for turning on the power, receiving and processing code data is initiated for representing a stand-by state to accept data. If the client machine is in a normal state, a process flows to a step S12 to transfer a mail or the like, which informs the receiving of data, for the set client machine. If the client machine does not refuse to accept data, continuously received code data files are sequentially transferred. Upon terminating the transference, such a process as deleting the received data from the image memory 104 or the like is executed.

In the step S11, if the set client machine is not in a normal state, for example, in a case where the power can not be turned on even if the trigger signal is generated, a cable is disconnected, the power initiating from an external is prohibited or the like, a process flows to a step S13 and such an error process as informing an error which is caused since a transference to the transmission side is failed or record outputting of an error report by the record control unit 114 is executed.

In the step S2, if a reception terminal is designated from the transmission side (by a user ID or the like), a process flows to a step S14 and it is judged whether the designated client machine is initiated or not (whether the power is turned on or not). If the designated client machine is not initiated, a process flows to a step S15 and the power-on trigger signal is generated for the designated client machine as in the case of above-mentioned step S9. Thereafter, the code data file reception is continuously performed to check the termination of the reception (step S16), a state of the client machine in the step S14 is observed until the reception is terminated and a process for generating the trigger signal in the step S15 is properly repeated. In the step S16, if it is judged that the data reception is terminated, a process flows to a step S17 to judge whether the designated client machine is in a normal state or not as in the case of above-mentioned step S11. If the designated client machine is in a normal state, a process flows to a step S18 to transfer the mail or the like, which informs the receiving of data, for the designated client machine. If the client machine does not refuse to accept data, continuously received code data files are sequentially transferred. Upon terminating the transference, such a process as deleting the received data from the image memory 104 or the like is executed. In the step S17, if it is judged that the set client machine is not in a normal state, a process flows to a step S19 and such an error process as mentioned above is executed for terminating a process.

As described above, according to the present invention, when data is received, even if a power of a client machine on a LAN is turned off, the client machine is automatically initiated by a facsimile apparatus connected to the LAN, thereby, enabling to initiate the client machine such that it becomes operable.

Since a communication using code data is enabled by a facsimile communication procedure, data can be reduced as compared with a communication using image data, thereby, enabling to obtain high-quality data without enlarging a device.

Since the client machine is initiated by the facsimile apparatus and further, received data is transferred to the initiated client machine, it is prevented that the facsimile apparatus of which memory becomes full or the facsimile apparatus refuses a reception, thereby enabling to execute an effective process.

When the facsimile apparatus receives data, since the client machine is automatically initiated, a power of the client machine is turned off if unnecessary and the power of the client machine is turned on if necessary, thereby reducing unnecessary energy consumption.

Since a process of code data is executed by the client machine, the facsimile apparatus has not to contain means for processing code data, so that the apparatus can be cheaply constituted. Further, various processes can be processed by the client machine.

When the client machine is not initiated and does not become operable, since a process is executed as an error, it is not required to maintain code data continuously.

As mentioned above, received data can be effectively processed.

In the above-mentioned embodiment, since a process is executed by the facsimile apparatus 201 and the FAX server 118, the process can be assigned, thereby enabling to realize an effective process.

However, the above-mentioned effect can be sufficiently achieved even if the above facsimile apparatus and FAX server are treated as one device.

Although the process according to the above embodiment is controlled by the CPU 101 based on programs stored in the ROM 102 (a process by programs installed in the FAX server is included), it is possible to store data indicating the programs in such a detachable storing medium as a photo-magnetic disk or the like and adapt the process to another device which can read data.

As above, the present invention is described based on the preferable embodiment, however the present invention is not limited to the present embodiment, but can be modified in various manners within the scope of following claims.

What is claimed is:

1. A data communication apparatus comprising:
   a receiver, arranged to receive data from a transmission side through a public telephone network;
   a connector, arranged to connect said apparatus to an external client device of a plurality of external client devices via a communication network other than the telephone network;
   an instructor, arranged so as, when the external client device is not in a state capable of processing the data received by said receiver, to instruct the external client device to cause the external client device to change to the state capable of processing the received data;
   a printer, arranged to print an image based on the data received by said receiver through the telephone network;
   a data transferor, arranged to transfer the received data to the external client device through said connector;
   a data discriminator, arranged to discriminate whether a type of data received by said receiver is to be processed by said printer or by the external client device; and
   a controller, arranged so as, in response to said data discriminator discriminating that the type of the received data is a type to be processed by the external client device, to control said instructor and said data transferor to cause said data transferor to transfer the received data to the external client device after the external client device has changed to the state capable of processing the received data, while said instructor does not instruct the external client device, said transferor does not transfer the received data to the external client device, and said printer prints the image based on the received data in response to said data discriminator discriminating that the type of the received data is a type to be processed by said printer,
   wherein whether the external client device is in the state capable of processing data is determined based on information obtained from the communication network.

2. An apparatus according to claim 1, wherein said instructor instructs the external client device in a case where data received by said receiver is discriminated as code data in said data discriminator.

3. An apparatus according to claim 1, wherein said instructor turns on the external client device when power to the external client device is turned off.

4. An apparatus according to claim 1, further comprising record means for recording data received by said receiver.

5. An apparatus according to claim 4, wherein said record means performs a recording in a case where data received by said receiver is discriminated to be image data by said data discriminator.

6. An apparatus according to claim 1, wherein said data communication apparatus includes a facsimile apparatus and a FAX server.

7. A data communication apparatus comprising:
   a receiver, arranged to receive data from a transmission side through a public telephone network;
   a connector, arranged to connect said apparatus to a local area network (LAN);
   a data transferor, arranged to transfer data received by said receiver to a designated client terminal of a plurality of client terminals on the LAN;
   a status determinor, arranged to determine whether or not the client terminal is in a state capable of accepting the received data in response to reception of the data from the transmission side by said receiver, based on information obtained from the LAN; and
   an instructor, arranged so as, when said status determinor determines that the client terminal is not in the state capable of accepting the received data, to instruct the client terminal to cause the client terminal to change into the state capable of accepting the received data,
   wherein said data transferor transfers the received data after the client terminal has changed into the state capable of accepting the received data, and
   wherein said data transferor transfers data to the client terminal when information for designating the client terminal on the LAN is received from the transmission side by said receiver.

8. An apparatus according to claim 7, wherein information for designating the client terminal on the LAN includes information for specifying the client terminal.

9. An apparatus according to claim 7, further comprising a setter, arranged to set a transferred party to which a transfer is performed by said data transferor, wherein said data transferor transfers data to a terminal of the transferred party set by said setter.

10. An apparatus according to claim 7, wherein said instructor turns on the client terminal when power to the client terminal is turned off.

11. A data communication method of a data communication apparatus, said method comprising:
   a reception step of receiving data from a transmission side through a public telephone network;
   an instruction step of, when an external client device of a plurality of external client devices connected to the data communication apparatus via a communication network other than the telephone network to receive data is not in a state capable of processing the data received in said reception step, instructing the external client device to cause the external client device to change to the state capable of processing the data received in said reception step;
   a print step of printing an image based on the data received in said reception step through the telephone network;

a transfer step of transferring the received data to the external client device;

a discrimination step of discriminating whether a type of data received in said reception step is to be processed in said print step or by the external client device; and a control step of, in response to said discrimination step discriminating that the type of the received data is a type to be processed by the external client device, controlling said instruction step and said transfer step to cause said transfer step to transfer the received data to the external client device after the external client device is changed to the state capable of processing the received data, while said instruction step does not instruct the external client device, said transfer step does not transfer the received data to the external client device, and said print step prints the image based on the received data in response to said discriminating step discriminating that the type of the received data is a type to be processed by the printer, wherein whether the external client device is in the state capable of processing data is determined based on information obtained from the communication network.

12. A data communication method comprising:

a reception step of receiving data from a transmission side through a public telephone network;

a transfer step of transferring data received in said reception step to a designated client terminal of a plurality of client terminals on a local area network (LAN);

a determination step of determining whether or not the client terminal is in a state capable of accepting the received data in response to reception of the data from the transmission side in said reception step, based on information obtained from the LAN; and an instruction step of, when said determination step determines that the client terminal is not in the state capable of accepting the received data, instructing the client terminal to cause the client terminal to change into the state capable of accepting the received data, wherein said transfer step transfers the received data after the client terminal has changed into the state capable of accepting the received data, and wherein said data transfer step transfers data to the client terminal when information for designating the client terminal on the LAN is received from the transmission side in said reception step.

13. A data processing apparatus comprising:

a receiver, arranged to receive data from a transmission side through a public telephone network;

a connector, arranged to connect said apparatus to an external client device of a plurality of external client devices via a communication network other than the telephone network;

an instructor, arranged so as, when the external client device is not in a state capable of processing the data received by said receiver, to instruct the external client device to cause the external client device to change to the state capable of processing the data received by said receiver;

a printer, arranged to print an image based on the data received by said receiver through the telephone network;

a data transferor, arranged to transfer the data received by said receiver to the external client device through said connector;

a data discriminator, arranged to discriminate whether a type of data received by said receiver is to be processed by said printer or by the external client device; and a controller, arranged to control said instructor to instruct said data transferor to transfer the received data only when it is discriminated by said data discriminator that the received data is to be transferred by said data transferor, while said instructor does not instruct the external client device, said transferor does not transfer the received data, and said printer prints the image based on the received data when it is discriminated by said data discriminator that the received data is a type to be processed by said printer, wherein whether the external client device is in the state capable of processing data is determined based on information obtained from the communication network.

14. An apparatus according to claim 13, wherein said instructor turns power on to the external client device when the power to the external client device is turned off.

15. An apparatus according to claim 13, wherein said instructor sends a signal that is used by the external client device to initiate application software to process the received data.

16. A data processing apparatus comprising:

a receiver, arranged to receive data from a transmission side through a public telephone line by a facsimile communication;

a connector, arranged to connect said apparatus to an external client device of a plurality of external client devices via a communication network other than the telephone line;

a data transferor, arranged to transfer the data received by said receiver to the external client device through said connector;

a status determinor, arranged to determine whether or not the external client device connected by said connector is in an operable state capable of processing the data received by said receiver in response to reception of the data from the transmission side by said receiver, based on information obtained from the communication network; and a controller, arranged so as, when said status determinor determines that the external client device is in the operable state, to transfer the received data using said data transferor, and for, when said status determinor determines that the external client device is not in the operable state, to transfer the received data to the external client device after instructing the external client device to change to the operable state, wherein said data transferor transfers data to the external client device when information for designating the external client device on the communication network is received from the transmission side by said receiver.

17. An apparatus according to claim 16, wherein said printer prints the image representing the data not transferred by said data transferor.

18. An apparatus according to claim 16, wherein the communication network is a local area network (LAN), and said data transferor transfers the received data to an external client device on the LAN in accordance with a designation from the transmission side.

19. A storage medium storing computer-readable program instructions for executing a data communication method of a data communication apparatus, the method comprising:

a reception step of receiving data from a transmission side through a public telephone network;

an instruction step of, when an external client device of a plurality of external client devices connected to the data communication apparatus via a communication network other than the telephone network to receive data is not in a state capable of processing the data received in said reception step, instructing the external client device to cause the external client device to change to the state capable of processing the data received in said reception step;

a print step of using a printer to print an image based on the data received in said reception step through the telephone network;

a transfer step of transferring the received data to the external client device;

a discrimination step of discriminating whether a type of data received in said reception step is to be processed in said print step or by the external client device; and a control step of, in response to said discrimination step discriminating that the type of the received data is a type to be processed by the external client device, controlling said instruction step and said transfer step to cause said transfer step to transfer the received data to the external client device after the external client device is changed to the state capable of processing the received data, while said instruction step does not instruct the external client device, said transfer step does not transfer the received data, and said printer prints the image based on the received data in response to said discrimination step discriminating that the type of the received data is a type to be processed by the printer, wherein whether the external client device is in the state capable of processing data is determined based on information obtained from the communication network.

20. A storage medium storing computer-readable program instructions for executing a data communication method, the method comprising:

a reception step of receiving data from a transmission side through a public telephone network;

a transfer step of transferring data received in said reception step to a designated client terminal of a plurality of client terminals on a local area network (LAN);

a determination step of determining whether or not the client terminal is in a state capable of accepting the received data in response to reception of the data from the transmission side in said reception step, based on information obtained from the LAN; and an instruction step of, when said determination step determines that the client terminal is not in the state capable of accepting the received data, instructing the client terminal to cause the client terminal to change into the state capable of accepting the received data, wherein said transfer step transfers the received data after the client terminal has changed into the state capable of accepting the received data, and wherein said data transfer step transfers data to the client terminal when information for designating the client terminal on the LAN is received from the transmission side in said reception step.

21. A data processing method for controlling a data processing apparatus, said method comprising:

a reception step of receiving data from a transmission side through a public telephone network;

an instruction step of, when an external client device of a plurality of external client devices connected to the data processing apparatus via a communication network other than the telephone network to receive data is not in a state capable of processing the data received in said reception step, instructing the external client device to cause the external client device to change to the state capable of processing the data received in said reception step;

a print step of using a printer to print an image based on the data received in said reception step through the telephone network;

a transfer step of transferring the received data received to the external client device;

a discrimination step of discriminating whether a type of data received in said reception step is to be processed in said printing step or by the external client device; and a control step of controlling said instruction step to instruct said transfer step to transfer the received data when it is discriminated in said discrimination step that the received data is to be transferred in said transfer step, while said instruction step does not instruct the external client device, said transfer step does not transfer the received data, and said printing step prints the image based on the received data when it is discriminated in said discrimination step that the received data is a type to be processed by the printer, wherein whether the external client device is in the state capable of processing data is determined based on information obtained from the communication network.

22. A data processing method for controlling a data processing apparatus, said method comprising:

a reception step of receiving data from a transmission side through a public telephone line by a facsimile communication;

a determination step of determining whether or not an external client device of a plurality of external client devices connected to the data processing apparatus via a communication network other than the telephone line is in an operable state capable of processing the data received in said reception step in response to reception of the data from the transmission side in said reception step, based on information obtained from the communication network;

a transfer step of transferring the received data to the external client device via the communication network; and a control step of, when said determination step determines that the external client device is in the operable state, transferring the received data in said transfer step, and of, when said determination step determines that the external client device is not in the operable state, transferring the received data to the external client device only after instructing the external client device to change to the operable state, wherein said transfer step includes transferring data to the external client device when information for designating the external client device on the communication network is received from the transmission side in said reception step.

23. A storage medium storing computer-readable program instructions for executing a data processing method for a data processing apparatus, the method comprising:

a reception step of receiving data from a transmission side through a public telephone network;

an instruction step of, when an external client device of a plurality of external client devices connected to the data processing apparatus via a communication network other than the telephone network to have data transferred thereto is not in a state capable of processing the data received in said reception step, instructing the external client device to cause the external client device to change to the state capable of processing the data received in said reception step;

a print step of using a printer to print an image based on the data received in said reception step through the telephone network;

a transfer step of transferring the received data to the external client device;

a discrimination step of discriminating whether a type of data received in said reception step is to be processed in said print step or by the external client device; and a control step of controlling said instruction step to instruct said transfer step to transfer the received data to the external client device when it is discriminated in said discrimination step that the received data is to be transferred in said transfer step, while said instruction step does not instruct the external client device, said transfer step does not transfer the received data, and said print step prints the image based on the received data when it is discriminated in said discrimination step that the received data is a type to be processed by the printer, wherein whether the external client device is in the state capable of processing data is determined based on information obtained from the communication network.

24. A storage medium storing computer-readable program instructions for executing a data processing method of a data processing apparatus, the method comprising:

a reception step of receiving data from a transmission side through a public telephone line by a facsimile communication;

a determination step of determining whether or not an external client device of a plurality of external client devices connected to the data processing apparatus via a communication network other than the telephone line is in an operable state capable of processing the received data in response to reception of the data from the transmission side in said reception step, based on information obtained from the communication network;

a transfer step of transferring the data received in said reception step to the external client device through a connector; and a control step of, when said determination step determines that the external client device is in the operable state, controlling said transfer step to transfer the data received in said transfer step, and of, when said determination step determines that the external client device is not in the operable state, controlling said transfer step to transfer the received data to the external client device only after instructing the external client device to change to the operable state, wherein said transfer step includes transferring data to the external client device when information for designating the external client device on the communication network is received from the transmission side in said reception step.

* * * * *

UNITED STATES PATENT AND TRADEMARK OFFICE
CERTIFICATE OF CORRECTION

PATENT NO. : 6,639,693 B1
DATED : October 28, 2003
INVENTOR(S) : Seishi Ejiri et al.

It is certified that error appears in the above-identified patent and that said Letters Patent is hereby corrected as shown below:

Column 1,
Line 10, "an" should be deleted.
Line 12, "another" should read -- other --.
Line 24, "can not" should read -- cannot --.

Column 2,
Line 65, "smoozing" should read -- smoothing --.

Column 3,
Line 64, "discriminates" should read -- discriminate --.

Column 4,
Line 15, "called" should read -- referred to --.
Line 38, "is" should be deleted.
Line 39, "corresponding" should read -- corresponds --.

Column 5,
Line 2, "vacant" should read -- in a vacant --.

Column 6,
Line 1, "a" (third occurrence) should be deleted.
Line 8, "can not" should read -- cannot --.
Line 67, "has not" should read -- does not need --.

Column 8,
Line 45, "wherein" should read -- ¶ wherein --.

Signed and Sealed this

Twentieth Day of April, 2004

JON W. DUDAS
*Acting Director of the United States Patent and Trademark Office*